US012811081B2

(12) United States Patent
Ranka et al.

(10) Patent No.: US 12,811,081 B2
(45) Date of Patent: Nov. 24, 2026

(54) COMPACT HIGH-ISOLATION ELECTROMAGNETIC RELAY WITH AN INTEGRAL MONOBLOC CASING

(71) Applicant: Paramount Industries, Bangalore (IN)

(72) Inventors: Akash Ranka, Bangalore (IN); Sapna Ranka, Nizampet (IN)

(73) Assignee: Paramount Industries, Bangalore (IN)

( * ) Notice: Subject to any disclaimer, the term of this patent is extended or adjusted under 35 U.S.C. 154(b) by 238 days.

(21) Appl. No.: 18/742,826

(22) Filed: Jun. 13, 2024

(65) Prior Publication Data

US 2025/0273418 A1 Aug. 28, 2025

(30) Foreign Application Priority Data

Feb. 26, 2024 (IN) ............................. 202441013819

(51) Int. Cl.

| | |
|---|---|
| ***H01H 50/02*** | (2006.01) |
| ***H01H 50/08*** | (2006.01) |
| ***H01H 50/18*** | (2006.01) |
| ***H01H 50/36*** | (2006.01) |

(52) U.S. Cl.

CPC .......... *H01H 50/023* (2013.01); *H01H 50/08* (2013.01); *H01H 50/18* (2013.01); *H01H 50/36* (2013.01)

(58) Field of Classification Search

None

See application file for complete search history.

(56) References Cited

U.S. PATENT DOCUMENTS

| | | | | |
|---|---|---|---|---|
| 6,081,177 A * | 6/2000 | Fausch | H01H 50/642 623/1.51 |
| 2009/0153277 A1* | 6/2009 | Parker | H01H 50/34 335/194 |
| 2009/0167469 A1* | 7/2009 | Fujiwara | H01H 50/643 335/165 |
| 2014/0240065 A1* | 8/2014 | Sakai | H01H 50/642 335/187 |
| 2015/0042425 A1* | 2/2015 | Sumino | H01H 50/643 335/189 |

* cited by examiner

*Primary Examiner* — Bernard Rojas

(74) *Attorney, Agent, or Firm* — Rivka Friedman

(57) ABSTRACT

The present invention is relating to an electromagnetic relay (100) comprising a bobbin assembly (10) a comprising a bobbin (12) wound with an annular coil (14), a core (16) insertable into said bobbin (12) and plurality of yolks (18). Further, the electromagnetic relay (100) comprises a plurality of contacts (20) that includes at least one fixed contact (20*a*) and at least one movable contact (20b) are configured to open and close the electromagnetic relay (100). In addition, a floating type pusher (30) configured to transfer armature (22) movement to the movable contact (20b) upon activation of said coil (14). Accordingly, the electromagnetic relay (100) is formed integrally enclosed in a moulded plastic casing (40) as a monobloc, and the casing (40) is configured to provide electric isolation in the electromagnetic relay (100).

6 Claims, 4 Drawing Sheets

COMPACT HIGH-ISOLATION ELECTROMAGNETIC RELAY WITH AN INTEGRAL MONOBLOC CASING

FIELD OF THE INVENTION

The present invention is related to the field of electromagnetic relays. More particularly, to a compact electromagnetic relay having increased clearance and creepage to provide electric isolation.

BACKGROUND OF THE INVENTION

The following description of related art is intended to provide background information pertaining to the field of the present disclosure. This section may include certain aspects of the art that may be related to various aspects of the present disclosure. However, it should be appreciated that this section be used only to enhance the understanding of the reader with respect to the present disclosure, and therefore, unless otherwise indicated, it should not be assumed that any of the approaches described in this section qualify as prior art merely by virtue of their inclusion in this section.

In current industry, electromagnetic relays are widely used in different applications and products that includes household appliances, aviation, aerospace, rail transit, communication and control devices, electromechanical integration and power electronic equipment. Electromagnetic relays are electronic control components that use electromagnets to control working circuits on and off. Further, electromagnetic relays include an isolation function and are considered important control elements that enables automatic adjustment, safety protection, and are useable in a switching circuit and in a control circuit. With latest products and various industry needs, the requirements for high and low voltage insulation distance of products are also getting higher and higher. While maintaining the characteristics of small size and low coil power, it needs to meet sufficient insulation distance and electrical clearance.

Existing electromagnetic relays mainly include bases, coils, iron cores, armature. However, due to the structure of the armature part the distance between the armature and the connecting piece are often very less. Since the connecting piece and armature are capable of conducting electricity, the lack of sufficient distance between them causes the creep age distance and electrical clearance to be small, which affects the safe use of the electromagnetic relay.

These problems accompanied with the human head not being upright, have not been dealt properly until today. Current solution requires personal assistants for helping the persons with muscular dystrophy. However, the personal assistants quickly tire from holding the head and upper body upright.

SUMMARY OF THE INVENTION

Accordingly, in at least one embodiment, the present invention is relating to an electromagnetic relay.

The electromagnetic relay of the present invention comprises a bobbin assembly a comprising a bobbin wound with an annular coil, a core insertable into said bobbin and plurality of yokes, wherein the coil is configured to move an armature upon activation by means of voltage application. The electromagnetic relay comprises plurality of contacts configured to open and close the electromagnetic relay; the plurality of contacts includes at least one fixed contact and at least one movable contact. A floating type pusher configured to transfer armature movement to the movable contact upon activation of said coil. Accordingly, the electromagnetic relay is formed integrally enclosed in a moulded casing as a monobloc, further; the casing is configured to provide electric isolation in the electromagnetic relay. The technical effect of the electromagnetic relay formed as a monobloc is that the electromagnetic relay is able to provide clearance and creepage distance that provides better electric insulation, further, the electromagnetic relay is stable during vibration, and as the bobbin assembly is fully enclosed corrosion of the coil is avoided.

Accordingly, in one another embodiment, a clearance and creepage distance ranging between 10 mm to 12 mm is provided in the electromagnetic relay to provide the electric isolation, further, the isolation between the coil and contact is more than 8 KV VAC (rms).

Accordingly, in one another embodiment, the moulded casing (40) is a formed using at least one of plastic, polycarbonate, thermoplastic or other non-conductive materials.

Accordingly, in one another embodiment, the plurality of yokes, include a first upper yoke and second lower yoke Accordingly, in one another embodiment, the casing is formed by insert-molding to include the bobbin assembly, the plurality of contacts and the pusher, wherein the portion of the plurality of contacts are arranged outside of the casing.

Accordingly, in one another embodiment, the electromagnetic relay comprises a flag indicator configured as an internal feature in the electromagnetic relay. In addition, the flag indicator may be used to indicate the Mechanical ON/OFF the Normally Open/Normally Closed contacts of the electromagnetic relay.

Accordingly, in one another embodiment, the electromagnetic relay comprises at least one pin (50) configured to be mounted on a socket.

Accordingly, in one another embodiment, at least one pin includes PCB pins configured to be mounted on a PCB, and wherein the PCB are straight (vertical) OR 90 degree bent (horizontal).

Accordingly, in one another embodiment, the electromagnetic relay comprises at least one test button, the at least one test button being one of a manual test button or a lockable push button.

Accordingly, in one another embodiment, the electromagnetic relay comprises a sealing member configured to prevent ingress of foreign material inside the electromagnetic relay. Accordingly, the sealing member may be an O-ring, a rubber gasket, epoxy coating or similar sealing arrangements. The sealing member may be preferably provided near the terminals of the electromagnetic relay. The provision of sealing member allows the electromagnetic relay to be used in various applications where the electromagnetic relays has to be used in the closed environment, such that the sealing member avoids penetration of flux vapors and the other gases inside the electromagnetic relay.

Accordingly, in one another embodiment, the electromagnetic relay additionally comprises a magnet for boosting the DC rating capacity of the electromagnetic relay.

Accordingly, in one another embodiment, can also be used as remanence relay OR latching relay.

BRIEF DESCRIPTION OF ACCOMPANYING DRAWINGS

The invention will now be described in relation to the accompanying drawings in which FIG. 1 shows an electromagnetic relay in accordance with one embodiment of present invention;

DETAILED DESCRIPTION OF THE PREFERRED EMBODIMENT

The embodiments herein, the various features, and advantageous details thereof are explained with reference to the non-limiting embodiments. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments of the present invention will be described and illustrated hereinafter with reference to the accompanying drawings. However, the solutions disclosed herein may be implemented in many different forms and should not be construed as limited to the embodiments set forth herein.

The present invention pertains to electromagnetic relay used in applications such as in household appliances, aviation, aerospace, rail transit, communication and control devices, electromechanical integration, power electronic equipment etc. In industry application there is a need to improve the clearance and creep age of the electromagnetic relays to attain better electronic insulations. Further, it is paramount that the electromagnetic relay should be of compact size to be able to be integrated in different components.

Figure 1:
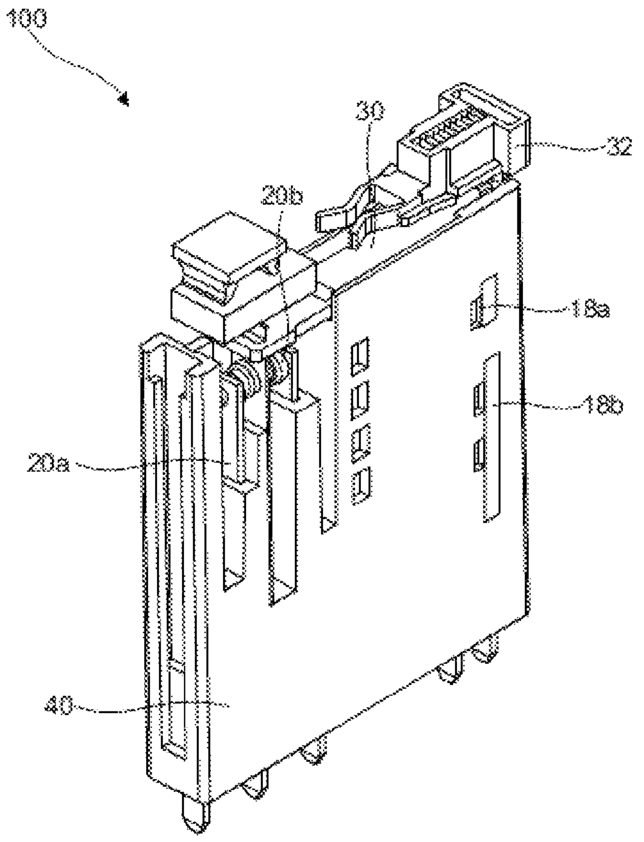

FIG. 1 illustrates an electromagnetic relay according to the embodiments of the present invention. The electromagnetic relay 100 of the present invention comprises a bobbin assembly 10, plurality of contacts 20 and a floating type pusher 30. Accordingly, The bobbin assembly 10 further includes a plurality of yokes 18 arranged in proximity to the bobbin 12. In addition, the bobbin 12 is wound with an annular coil 14, the annular coil is metallic coil usually made of copper. In accordance with the embodiment of present invention the core 16 and plurality of yolksyokes 18 are made of soft magnetic iron. Accordingly, the bobbin assembly 10 forms a magnetic circuit, that is capable of turning the soft magnetic iron parts namely the core 16 and the plurality of yokes 18 into a temporary magnet when power is supplied to said coil 14. Generally, the yolksyokes 18 are arranged near the coil 14 such that the magnetic flux is transferable between the coil and the yolksyokes 18.

Figure 4:
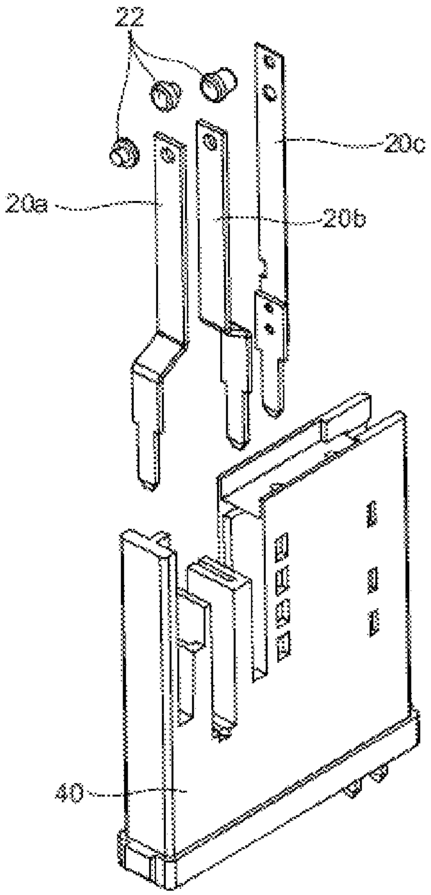
FIG. 4 shows a plurality of contacts of the electromagnetic relay of FIG. 1 in accordance with one embodiment of present invention.

In addition, the bobbin assembly 10 is configured to move an armature 22 upon said activation by means of voltage application.

an embodiment of the present invention, the electromagnetic relay 100 further comprises a plurality of contacts 20. The plurality of contacts 20 are configured to open and close the electromagnetic relay 100. Accordingly, the plurality of contacts 20 includes at least one fixed contact 20*a*, 20*c* and at least one movable contact 20*b*. The fixed contact 20*a*, 20*c* and the movable contact 20*b* generally include an elongated section and are generally disposed in a holder. The fixed contact 20*a*, 20*c* and the movable contact 20*b* are arranged to face each other at predetermined intervals, as shown in FIG. 4, and include a contact mechanism 22 at one end of said elongated section. The contact mechanism 22 may be provided in form of rivets that are riveted with said elongated section. Further, the electromagnetic relay 100 comprises a floating type pusher 30 configured to transfer armature 22 movement to the movable contact 20*b* upon activation of said coil 14. The floating type pusher is able to provide high contact pressure to the existing electromagnetic relays. Additionally, at least one test button 32 may be provided to the electromagnetic relay 100, the at least one test button 32 may be configured to be in contact with the pusher 30 (refer FIG. 1).

Figure 2:
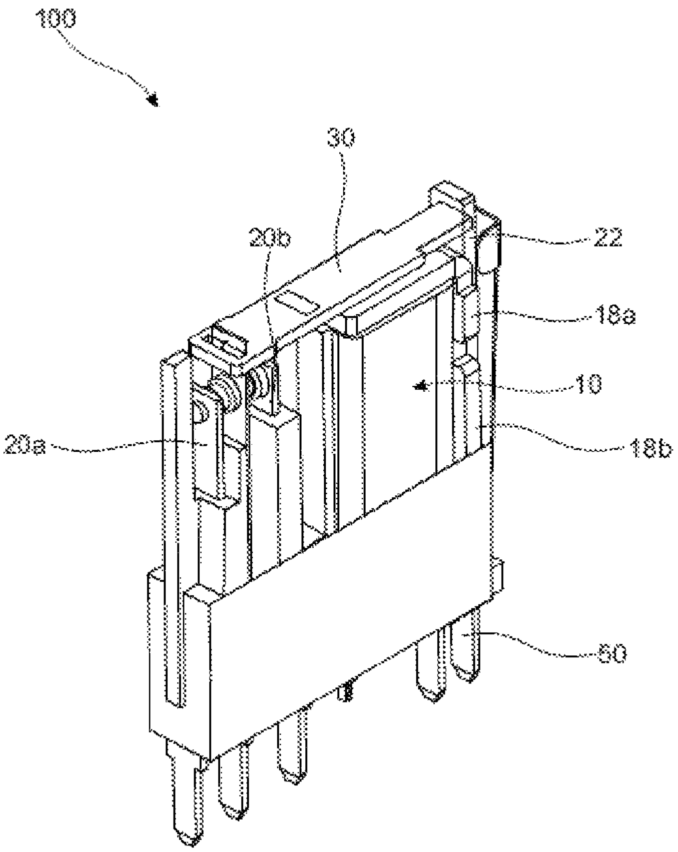
FIG. 2 shows the electromagnetic relay of FIG. 1 with partial casing in accordance with one embodiment of present invention.
Figure 3:
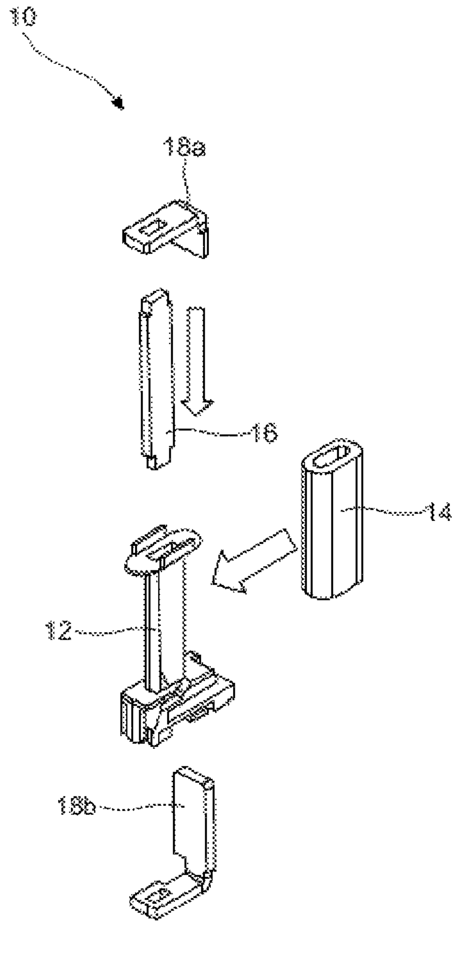
FIG. 3 shows an exploded view of a bobbin assembly of the electromagnetic relay of FIG. 1 in accordance with an embodiment of present invention.

FIG. 2 shows an electromagnetic relay 100 of the present invention in an assembled state without the casing 40. The electromagnetic relay 100 includes a bobbin assembly 10 and plurality of yokes that include a first upper yoke 18*a* and second lower yoke 18*b* are arranged in proximity to the bobbin assembly 10. Further, the armature 22 is arranged near the first upper yoke 18*a* and the second lower yoke 18*b*. The electromagnetic relay 100 is assembled such that the fixed contact 20*a*, the movable contact 20*b*, and the coil terminal (not marked in Figures) extend outwards. Further, the electromagnetic relay 100 includes a pusher 30 assembled on top of the electromagnetic relay 100. The pusher 30 is arranged in working contact with the armature 22 and the fixed contact 20*a*, 20*c* and moving contact 20*b*.

In an embodiment of the present invention as shown in FIG. 1, the electromagnetic relay 100 is formed integrally enclosed in a moulded plastic casing 40 as a monobloc. The casing 40 is configured to provide electric isolation in the electromagnetic relay 100. Accordingly, the casing 40 is formed by insert molding the electromagnetic relay and includes the bobbin assembly 10, the plurality of contacts 20 and the pusher 30. The electromagnetic relay 100 is integrated in the casing 40 such that the height of the casing surrounding the plurality of contacts 20 is lower than the positions of the fixed contact 20*a*, 20*c* and the movable contact 20*b*, so that the casing 40 does not interfere with the motion of the movable contact 20*b* toward the fixed contact 20*a*. The electromagnetic electromagnetic relay 100 according to the embodiment of present invention includes a clearance and creepage distance ranging between 10 mm to 12 mm to provide the electric isolation. According to the embodiment of the present invention, the electric isolation between the coil and contact is more than 8 KV VAC (rms), preferably ranging between 8 KV VAC (rms) to 12 KV VAC (rms). The above-disclosed effect of the present invention is achieved by enclosing the live components in plastic, a non-conductive material, or an insulating material.

an alternate embodiment of the present invention, the electromagnetic relay 100 comprises a flag indicator 60 that is configured to indicate internal feature in the electromagnetic relay 100. In addition, the electromagnetic relay 100 comprises at least one pin 50 configured to be mounted on a socket. Further, at least one pin 50 includes PCB pins configured to be mounted on a PCB. Accordingly, the PCB pins may be straight OR 90 degree bent as per the requirement of the device where the electromagnetic relay 100 is to be used. The pins 50 may be configured to complete the circuit and provide a connection. Additionally, the at least one test button (32) being one of a manual test button or a lockable push button.

In an alternate embodiment of the present invention, the electromagnetic relay 100 comprises a sealing member configured to prevent ingress of foreign material inside the electromagnetic relay 100. The sealing member may be provided at the base of the casing near the pins. The sealing member allows the electromagnetic relay 100 can be used in various applications where the electromagnetic relays has to be used in the closed environment and with this sealing member penetration of flux vapours and the other gases inside the electromagnetic relay may be avoided. Accordingly, the sealing member 60 may be an O-ring, a rubber gasket, an epoxy or similar materials that may provide air tight seal and further may be having insulating properties so that they are not affected by the magnetic flux generated in the electromagnetic relay 100.

Figure 5:
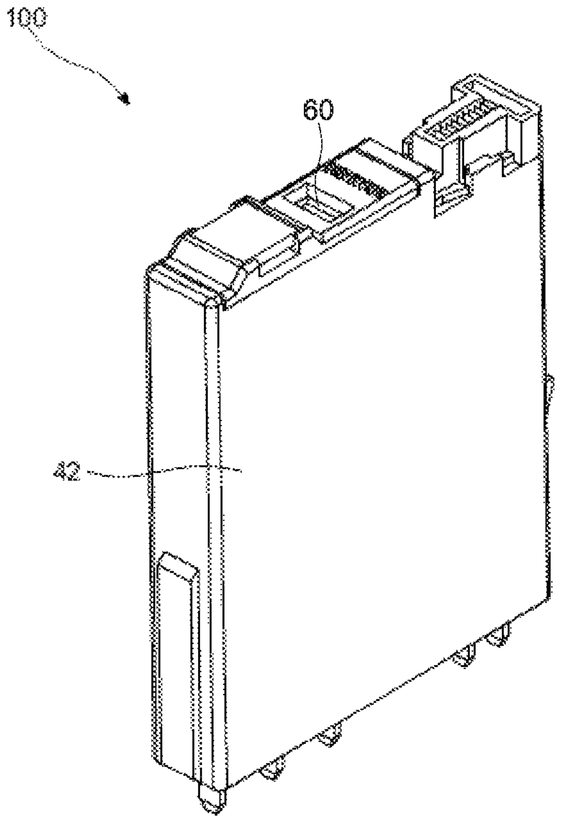
FIG. 5 shows the electromagnetic relay of FIG. 1 enclosed in a housing in accordance with one embodiment of present invention.

FIG. 5, shows the electromagnetic relay 100 according to an embodiment of the present invention, where the electromagnetic relay 100 along with the casing is placed inside a housing 42. Said housing 42 may be provided to enable additional protection to the electromagnetic relay from external disturbances. Alternatively, the housing 42 may be designed based on the application and design requirement.

Although the present invention has been described in considerable detail with reference to certain preferred embodiments and examples thereof, other embodiments and equivalents are possible. Even though numerous characteristics and advantages of the present invention have been set forth in the foregoing description, together with functional and procedural details, the disclosure is illustrative only, and changes may be made in detail, especially in terms of the procedural steps within the principles of the invention to the full extent indicated by the broad general meaning of the terms. Thus, various modifications are possible of the presently disclosed system and process without deviating from the intended scope of the present invention.

We claim:

1. An electromagnetic relay (100) comprising:

a bobbin assembly (10), comprising:

a bobbin (12) wound with an annular coil (14); and a core (16) insertable into said bobbin (12) and plurality of yokes (18), wherein the coil (14) is configured to move an armature (22) upon activation by means of voltage application;

a plurality of contacts (20) configured to open and close the electromagnetic relay (100), wherein the plurality of contacts (20) comprises at least one fixed contact (20*a*) and at least one movable contact (20*b*); and a floating type pusher (30) configured to transfer armature (22) movement to the movable contact (20*b*) upon activation of said annular coil (14), wherein the electromagnetic relay (100) is formed as a monobloc, comprising a moulded casing (40), the moulded casing integrally encloses the bobbin assembly (10) and the plurality of contacts (20) within the moulded casing (40), while terminal portions of the plurality of contacts (20) extend outside the moulded casing (40); and wherein the moulded casing (40), by integrally enclosing the bobbin assembly (10) and the plurality of contacts (20), provides a clearance distance and a creepage distance ranging from 10 mm to 12 mm between the annular coil (14) and the plurality of contacts (20); and wherein the electrical isolation between the annular coil (14) and the plurality of contacts (20) exceeds 8 kV VAC (RMS).

2. The electromagnetic relay (100) as claimed in claim 1, wherein the moulded casing (40) is a formed using at least one of plastic, polycarbonate, thermoplastic or other non-conductive materials.

3. The electromagnetic relay (100) as claimed in claim 1, wherein the plurality of yokes (18), include a first upper yoke (18*a*) and second lower yoke (18*b*).

4. The electromagnetic relay (100) as claimed in claim 1, wherein the electromagnetic relay (100) comprises a flag indicator (60) configured to indicate internal feature in the electromagnetic relay (100).

5. The electromagnetic relay (100) as claimed in claim 1, wherein the electromagnetic relay (100) comprises at least one pin (50) configured to be mounted on a socket.

6. The electromagnetic relay (100) as claimed in claim 1, wherein the electromagnetic relay (100) comprises at least one test button (32), the at least one test button being one of a manual test button or a lockable push button.

* * * * *